US006802016B2

United States Patent
Liu

(10) Patent No.: US 6,802,016 B2
(45) Date of Patent: Oct. 5, 2004

(54) USER PROXIMITY SENSOR AND SIGNAL PROCESSING CIRCUITRY FOR DETERMINING WHETHER TO POWER A COMPUTER ON OR OFF

(75) Inventor: Chu-Kung Liu, Taipei (TW)

(73) Assignee: Twinhead International Corp., Hsintien (TW)

( * ) Notice: Subject to any disclaimer, the term of this patent is extended or adjusted under 35 U.S.C. 154(b) by 618 days.

(21) Appl. No.: 09/779,171

(22) Filed: Feb. 8, 2001

(65) Prior Publication Data

US 2002/0147931 A1 Oct. 10, 2002

(51) Int. Cl.[7] ............................................. G06F 1/32
(52) U.S. Cl. ..................... 713/323; 340/686.6; 710/306
(58) Field of Search ...................... 710/306; 713/200, 713/323; 340/686.6

(56) References Cited

U.S. PATENT DOCUMENTS

| | | | | |
|---|---|---|---|---|
| 5,675,810 A | * | 10/1997 | Sellers ........................ | 713/323 |
| 5,835,083 A | * | 11/1998 | Nielsen et al. .............. | 345/211 |
| 6,062,478 A | * | 5/2000 | Izaguirre et al. ........ | 235/462.47 |
| 6,356,965 B1 | * | 3/2002 | Broyles et al. ............. | 710/104 |
| 6,374,145 B1 | * | 4/2002 | Lignoul ........................ | 700/17 |
| 6,401,209 B1 | * | 6/2002 | Klein .......................... | 713/200 |
| 6,418,536 B1 | * | 7/2002 | Park ........................... | 713/323 |
| 6,519,290 B1 | * | 2/2003 | Green ......................... | 375/259 |
| 6,531,985 B1 | * | 3/2003 | Jones et al. ................. | 343/702 |
| 6,536,658 B1 | * | 3/2003 | Rantze ....................... | 235/375 |
| 6,560,711 B1 | * | 5/2003 | Given et al. ................ | 713/200 |
| 6,654,896 B1 | * | 11/2003 | Saunders et al. ........... | 713/323 |
| 6,691,237 B1 | * | 2/2004 | Verdun et al. .............. | 713/320 |

OTHER PUBLICATIONS

IBM Technical Diclosure Bulletin, "Minimizing Power Consumption in Micro–Processor Based Systems which Utilize Speech Recognition Devices", Issue 10, pp. 151–154, Oct. 1994.*
IBM Technical Disclosure Bulletin, "Active Infrared Presence Sensor", vol. 38, No. 12, pp. 419–422, Dec. 1995.*
IBM Technical Disclosure Bulletin, "Personal Computer Environmental Control Via Proximity Sensor", vol. 36, no. 8, pp. 343–346, Aug. 1993.*

* cited by examiner

Primary Examiner—Thomas Lee
Assistant Examiner—Albert Wang
(74) Attorney, Agent, or Firm—J.C. Patents

(57) ABSTRACT

A computer system having a sensing circuit for detecting a user status and switching a computer accordingly as well as an automatic networking capability. As a user walks into a sensing area, the computer starts up automatically so that some waiting time can be saved. Similarly, when the user walks away from the sensing area, the computer shut down automatically so that some power can be saved. The computer system includes a signal generator that sends out a transmission signal for determining if a user is within a detectable region. A signal receiver emits an appropriate status signal after picking up the transmission signal from the detection region. The status signal is processed by various devices including an analogue/digital converter, a delay unit, a logic circuit and a microprocessor before arriving at a power-triggering mechanism to switch on or off the computer accordingly.

29 Claims, 6 Drawing Sheets

USER PROXIMITY SENSOR AND SIGNAL PROCESSING CIRCUITRY FOR DETERMINING WHETHER TO POWER A COMPUTER ON OR OFF

BACKGROUND OF THE INVENTION

1. Field of Invention

The present invention relates to a computer device. More particularly, the present invention relates to a computer device capable of switching on or off according to detected user status, and a computer system capable of direct automatic networking.

2. Description of Related Art

The cost reduction of computer products in recent years has revolutionized the daily habits of society. Through a computer system, information can be obtained, and exchanged rapidly. However, before a computer system is fully functional, a series of steps must be performed by the computer after the power is turned on. For example these steps include, the downloading of windows software, the preparation of software driving tools and the execution of anti-virus programs. All these preparatory steps take time to complete and hence prevent a frequent computer user from accessing the computer system quickly. In addition, a conventional computer system demands the user initiate a shutdown program before turning off the computer. For a user that needs to leave in a hurry or simply forgets to initiate the shutdown procedure before leaving, power is wasted.

SUMMARY OF THE INVENTION

Accordingly, one object of the present invention is to provide a computer device capable of sensing current user status. The computer device is capable of initiating a start-up program to turn on a computer when a user is stationed close to the computer system for a preset period so that waiting time is minimized. Furthermore, the computer device is capable of executing a shutdown procedure after the user is absent for a preset period so that power is saved.

To achieve these and other advantages and in accordance with the purpose of the invention, as embodied and broadly described herein, the invention provides a computer device capable of sensing user status so that a computer system is turned on or off accordingly. The device includes a signal generator, a signal receiver, an analog/digital converter, a delay unit, a logic circuit, a microprocessor and a power-triggering mechanism.

The signal generator emits a transmission signal to determine if the user is close to or far away from the computer system. The signal receiver picks up the transmission signal from the signal generator and emits a status signal according to the user status. The analog/digital converter receives the status signal and emits a digital signal. The delay unit connects with the analog/digital converter for receiving the digital signal. After a period of delay, the delay unit issues a delay signal. The logic circuit connects with the analog/digital converter and the delay unit. On receiving the digital signal and the delay signal, the logic circuit generates a logic signal. The microprocessor connects with the logic circuit for emitting a processing signal after receiving the logic signal. The power-triggering mechanism connects with the microprocessor. The power-triggering mechanism starts up a shutdown computer system if the processing signal indicates a user close-by status or shuts down a turned on computer system if the processing signal indicates a user far-off status.

The transmission signal can be an infrared signal or an ultrasonic signal. In addition, a function-triggering mechanism can be set up in the device so that a user may immediately get to a pre-defined working environment such as a direct dial-up link with an e-mail or network server.

The signal generator includes an oscillator circuit, a first amplifier circuit, a second amplifier circuit, a resistor, and a light-emitting diode. The oscillator circuit generates an oscillating signal. The first amplifier circuit receives the oscillating signal and generates a first amplified signal. The second amplifier circuit receives the first amplified signal and generates a second amplified signal. A terminal of the resistor is connected to the second amplifier circuit while the other terminal is connected to the light-emitting diode for generating a transmission signal.

The signal receiver includes a transistor sensor, a buffer amplifier, a third amplifier, a voltage regulator, a comparator, a Zener diode, and a pulse-delaying unit. The buffer amplifier connects with the transistor sensor. The third amplifier connects with the buffer amplifier, and the voltage regulator connects with the third amplifier. The comparator connects with the third amplifier, the Zener diode connects with the comparator and the pulse-delaying unit connects with the comparator circuit.

This invention also provides a computer device capable of detecting user status and switching a computer system on or off. The computer device includes an infrared generator, a first amplifier, a light-emitting diode, an infrared detector, a first resistor, a second amplifier, a waveform filter, a waveform integrator, a second resistor, a diode, a capacitor, a delay circuit, a first bipolar transistor, a latching circuit, a second resistor, a second bipolar transistor, a fourth resistor, a fifth resistor, a first analog/digital converter, a sixth resistor, a seventh resistor, a timer, an eighth resistor, a second analog/digital converter, a microprocessor, and a power-triggering mechanism.

The first amplifier connects with the infrared generator. The light-emitting diode connects with the first amplifier. The light-emitting diode emits a transmission signal for determining user close-by or user far-away status. The infrared detector picks up the transmission signal and generates a status signal according to the detected user status. A terminal of the resistor connects with the infrared detector while the other terminal connects with an earth terminal. The second amplifier connects with one terminal of the first resistor and receives the status signal. The waveform filter connects with the second amplifier. The waveform integrator connects with the waveform filter. A terminal of the second resistor connects with the waveform integrator. The diode connects with the waveform integrator. A terminal of the capacitor connects with the diode while the other terminal connects with an earth terminal. The delay circuit connects with the diode. The base terminal of the bipolar transistor connects with the delay circuit, the collector terminal connects with the other terminal of the second resistor and the emitter terminal connects with an earth terminal. The latching circuit connects with one terminal of the capacitor. A terminal of the third resistor connects with the latching circuit while the other terminal connects with an earth terminal. The base terminal of the second bipolar transistor connects with the latching circuit and the emitter terminal connects with an earth terminal. A terminal of the fourth resistor connects with the collector terminal of the second bipolar transistor and the other terminal connects with a high voltage. A terminal of the fifth resistor connects with one terminal of the fourth resistor. The first analog/digital converter connects with the other terminal of the fifth resistor.

A terminal of the sixth resistor connects with the other terminal of the second resistor and the other terminal of the sixth resistor connects with an earth terminal. A terminal of the seventh resistor connects with the other terminal of the second resistor. A first terminal of the timer connects with the other terminal of the seventh resistor and a second terminal of the timer connects with the latching circuit. A terminal of the eighth resistor connects with a third terminal of the timer and the other terminal of the eighth resistor connects with a high voltage. The second analog/digital converter connects with the timer. The microprocessor connects with both the first and the second analog/digital converter and emits a processing signal. The power-triggering mechanism connects with the microprocessor for switching an off computer system on if the processing signal indicates a user close-by status or switching an on computer system off if the processing signal indicates a user far-away status.

This invention also provides a computer device for automatic linking with a computer network such that a computer system is switched on or off according to user status and is led to a particular functional state according to user selection. Besides the aforementioned signal generator, signal receiver, analog/digital converter, delay unit, a logic circuit, microprocessor, and power-triggering mechanism, it further includes a function-triggering key, a latching circuit, a embedded controller, a switch controller, a storage unit, a monitoring device and a driving unit. The function-triggering button on the computer device is a device for generating a triggering signal. The latching circuit connects with the function-triggering key for receiving the triggering signal and generating a latching signal. The embedded controller connects with the latching circuit, and the microprocessor. The embedded controller receives the latching signal and the processing signal to produce a scan signal. The switch controller connects with the latching circuit and the power-triggering mechanism decides if the received latching signal should be sent to the power-triggering mechanism or not. The storage unit serves a storage function. The monitoring device controls the writing of scan signal produced by the controller into the storage unit. The driving unit connects with the embedded controller for receiving the scan signal and drives one among a plurality of application programs. When the function-triggering button is pressed, an application program corresponding to the particular the button is selected.

This invention also provides a control system capable of automatically linking with a computer network such that a computer system is switched on or off according to user status and is led to a particular functional state according to user selection. The control system includes a central processing unit, a graphic controller, a main memory, a North bridge, a system bus, a network controller, a plurality of peripheral supporting devices, an input/output controller, a South bridge, a basic input/output system and a computer device. The central processing unit controls all data transactions. The graphic controller processes image patterns and displays text or image pattern on a screen. The main memory records and stores data. The North Bridge connects with the central processing unit, the graphic controller and the main memory to form an integrative operating device. The system bus connects with the North Bridge to serve as a transmission highway for data. The network controller connects with the system bus for linking with an external network. The plurality of peripheral supporting devices is responsible for the transmission of data to and from a user. The South Bridge connects with the system bus, the peripheral supporting devices and the input/output controller for integrating the function of the peripheral supporting devices and the input/output controller. The basic input/output system connects with the input/output controller. The computer device is able to detect user status, and connect with a computer network. The computer device connects with the basic input/output system and is responsible for submitting a triggering program.

The control system further includes a display device connecting to the graphic controller. The display device can be a liquid crystal display. The peripheral support devices may include a hard drive, a CD-ROM, a floppy drive, a battery, and a USB hub. In addition, a Blue-tooth may connect with the USB hub, a PS/2 port may connect with the input/output controller, and a serial port or a parallel port may connect with the input/output controller. Alternatively, an LED card may connect with the input/output controller. A voice controller may connect with the PCI bus. The voice controller may further include a voice receiver for receiving a voice signal and a voice output device connected to the voice controller for outputting a voice signal. A cable that links a wireless communication module with the PCI bus may also be included.

The network controller may further include a local area network (LAN), and modem mini PCI slot connected to the PCI bus as well as a LAN and modem connector connected to the local area network and modem mini PCI slot. Furthermore, the main memory can be synchronous dynamic random access memory (SDRAM).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
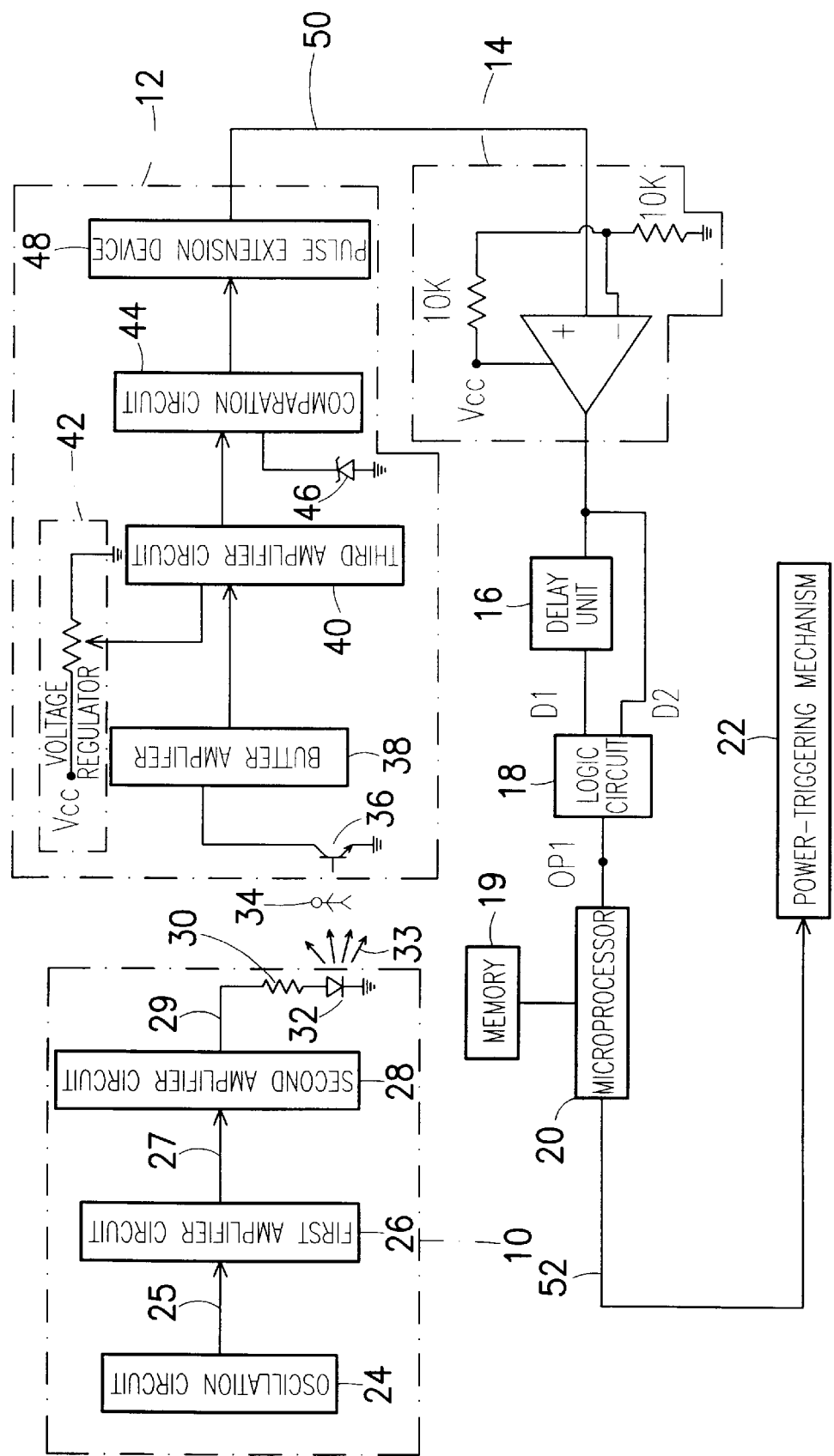
FIG. 1 is a block diagram showing a computer device capable of detecting user status according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing a first sensor apparatus capable of detecting user status according to a first embodiment of this invention. As shown in FIG. 1, the sensor apparatus of this invention includes a signal generator 10, a signal receiver 12, an analog/digital converter 14, a delay unit 16, a logic circuit 18, a microprocessor 20 and a power-triggering mechanism 22. The signal receiver 12 connects with the analog/digital converter 14. The analog/digital converter 14 connects with both the delay unit 16, and the logic circuit 18. The delay unit 16, and the logic circuit 18 are mutually connected. The logic circuit 18 connects with the microprocessor 20 and the microprocessor 20 connects with the power-triggering mechanism 22.

The signal generator 10 has an oscillator circuit 24 for producing an oscillatory signal 25. The oscillatory signal 25 is passed to a first amplifier circuit 26 for amplification. The first amplifier circuit 26 outputs a first amplified signal 27 and transmits the first amplified signal 27 to a second amplifier circuit 28. The second amplifier circuit 28 produces a second amplified signal 29. The second amplified signal 29 passes through a resistor 30 and a light-emitting diode 32 to produce a transmission signal 33. The transmission signal 33 is able to determine user status by detecting the position of a user 34. The user status is determined according to whether the user is close by or far away. The transmission signal 33 can be an infrared signal or an ultrasonic signal.

The signal receiver 12 on the corresponding side of the signal generator 10 includes a transistor sensor 36, a buffer amplifier 38 which is coupled to the transistor sensor 36, a third amplifier 40 which is coupled to the buffer amplifier 38, a voltage regulator 42 which is coupled to the third amplifier 40, a comparator 44 which is coupled to the third amplifier 40, a Zener diode 46 which is coupled to the comparator 44, and a pulse delay device 48 which is coupled to the Zener diode 46. The buffer amplifier 38 connects with the bipolar transistor 36, and the third amplifier 40 connects with the buffer amplifier 38. Both the voltage regulator 42 and the comparator 44 connect with the third amplifier 40. The Zener diode 46 connects with the comparator 44 and the pulse delay device 48 connects with the comparator 44. The signal receiver 12 is a device for producing a status signal 50 according to the user status implicated by the transmission signal.

Figure 2:
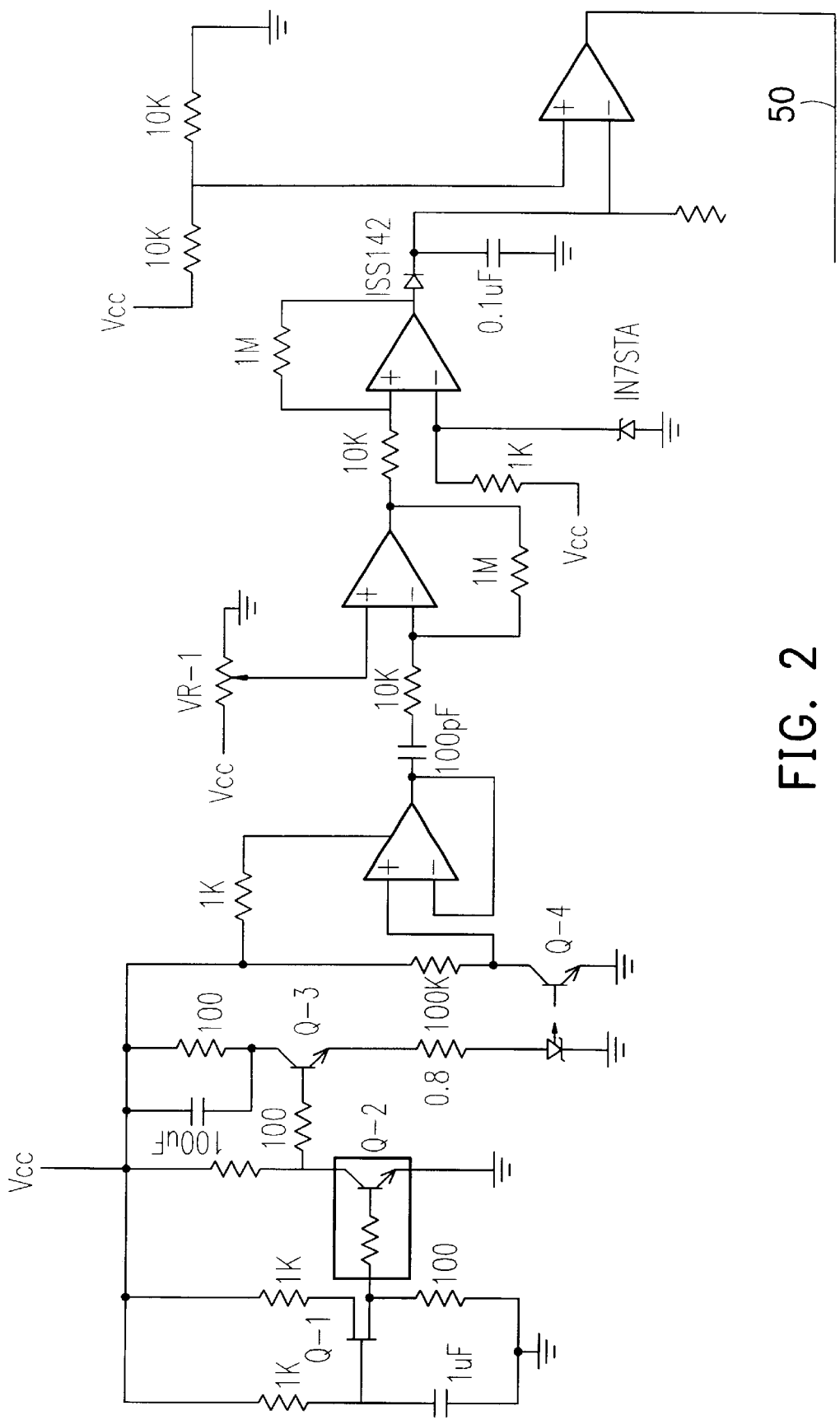
FIG. 2 is an equivalent circuit diagram of the signal generator and the signal receiver shown in FIG. 1.

In operation, the transistor sensor 36 of the signal receiver 12 picks up the transmission signal 33 reflected from anybody approaching to it. Density of the reflected signal is transmitted to the buffer amplifier 38 where noise is removed by a filter. The filtered signal is transmitted to the third amplifier 40 and then to the comparator 44. In the comparator 44, a voltage level greater than a particular pre-defined level is permitted to pass to output a pulse waveform. Ultimately, the pulse waveform is generated by the comparator 44. The pulse waveform is extended by the pulse delay device 48. FIG. 2 is an equivalent circuit diagram of the signal generator and the signal receiver shown in FIG. 1.

Aside from knowing whether a user is close by or far away, information regarding the current turn on or turn off status of the computer is also important. In general, four different states may be encountered, including (1) the computer is on and user is still present; (2) the computer is off, but a user has come within a detectable range; (3) the computer is on, but a user has gone outside the detectable range; and (4) the computer is off and no user is within the detectable range. The analog/digital converter 14, the delay unit 16, the logic circuit 18, the microprocessor 20 and the power-triggering mechanism 22 together serves to generate a specific signal according to the particular state the computer system encountered.

First, the analog/digital converter 14 picks up the status signal 50 and converts the status signal 50 into digital signal D2. For example, logic '1' indicates a user is within an observable range while logic '0' indicates nobody is within the observable range. The digital signal D2 is transmitted to the delay unit 16 as well as the logic circuit 18. The delay unit 16 can be a RC discharge circuit, a counter, etc., for example. The delay unit 16 outputs a delay signal D1. The amount of delay produced by the delay unit 16 is usually between 3~7 seconds. The delay signal D1 is responsible for determining if the user remains inside the detectable range or is in the process of moving into the detectable range or moving out of the detectable range. The logic circuit 18 receives the digital signal D2 from the analog/digital converter 14 and the digital signal D1 from the delay unit 16 at the same time and outputs a logic output signal OP1. Altogether four different input signal combinations are possible. The relationships between various input signals and the output signal are listed out in Table 1 below. In general, the four different input signal combinations can be used to symbolize the four different states encountered by the computer system.

TABLE 1

| | D1 | D2 | OP1 | State |
|---|---|---|---|---|
| Combination 1 | High | High | High | Computer on, user within detectable range. |
| Combination 2 | Low | High | High | Computer off, user moves into detectable range. |
| Combination 3 | High | Low | Low | Computer on, user moves out of the detectable range. |
| Combination 4 | Low | Low | Low | Computer off, nobody moves into the detectable range. |

The following is a brief explanation of the relationship between each signal and the state represented by the particular signal. In a first case, because a high level (logic level '1') is set whenever people are inside the detectable range, the delay signal D1 output from the delay unit 16 remains at the previous high in the presence of people. In addition, subsequent detection also indicates the user has not left yet. The digital signal D2 output by the analog/digital converter 14 remains high. Hence, the combination 1 shown in Table 1 is obtained. In the second case, the computer is off but a user walks into the detectable range of the system. Since the computer is off (representing the finding of an absent state in the previous detection), the delay signal D1 output from the delay unit 16 remains in the previous user absent state. In other words, the digital signal D1 is low. However, because a user now enters the detectable range, the digital signal D2 output by the analog/digital converter 14 becomes high. Hence, the combination 2 shown in Table 1 is obtained.

In the third case, the computer is on but user walks away from the detectable range. Since the computer is on (user is present is previous time period), the delay signal D1 output from the delay unit 16 remains in the previous user present state. In other words, the delay signal D1 is at a high level. However, the user now walks away from the detectable range in the next period so that the digital signal D2 output from the analog/digital converter 14 is at a low level. Hence, the combination 3 shown in Table 1 is obtained. In the last case, the computer is off and nobody walks into the detectable range. Since the computer is off (user is absent in the previously detected state), the delay signal D1 output from the delay unit 16 remains in the previous user absent state.

In other words, the digital signal D1 is at a low level. Because no user walks into the detectable range in the next period, the digital signal D2 output from the analog/digital converter 14 remains at a low level. Hence, the combination 4 shown in Table 1 is obtained.

The logic signal OP1 from the output terminal of the logic circuit 18 depends on the digital signal D2 from the analog/digital converter 14. As shown in Table 1, the digital signal D2 is high for the first and the second combination. Therefore, the logic signal OP is high. On the contrary, the digital signal D2 is low for the third and the fourth combination. Hence, the logic signal OP is low.

When the microprocessor 20 receives the logic signal OP1, a processing signal 52 is sent to the power-triggering mechanism 22 according to the state of the computer operation. For example, in combination 1, the user remains inside the detectable region of the computer and the logic signal OP1 is high. Furthermore, the microprocessor 20 knows the computer is already on according to the former state information supplied by the signal from the delay unit 16. Hence, the processing signal 52 (for example, provided by the memory unit 19 of the microprocessor 20) informs the power-triggering mechanism 22 to remain in the original state and refrain from switching the computer system on or off. In the second combination, the logic signal OP1 is high because a user is close by. The microprocessor 20 knows the computer is off according to the former state information supplied by the signal from the delay unit 16. Therefore, the processing signal 52 going to the power-triggering mechanism 22 will trigger a system start-up. In the third combination, the logic signal OP1 is low because the user has already walked away from the detectable range of the computer. The microprocessor 20 knows the computer is on according to the former state information supplied by the signal from the delay unit 16. Therefore, the processing signal 52 going to the power-triggering mechanism 22 will trigger a system shutdown. Similarly, in the fourth combination, the logic signal OP1 is low because the user has already walked away from the detectable range. The microprocessor 20 knows the computer is off according to the former state information supplied by the signal from the delay unit 16. Therefore, the processing signal 52 informs the power-triggering mechanism 22 not to switch on the system.

Figure 3:
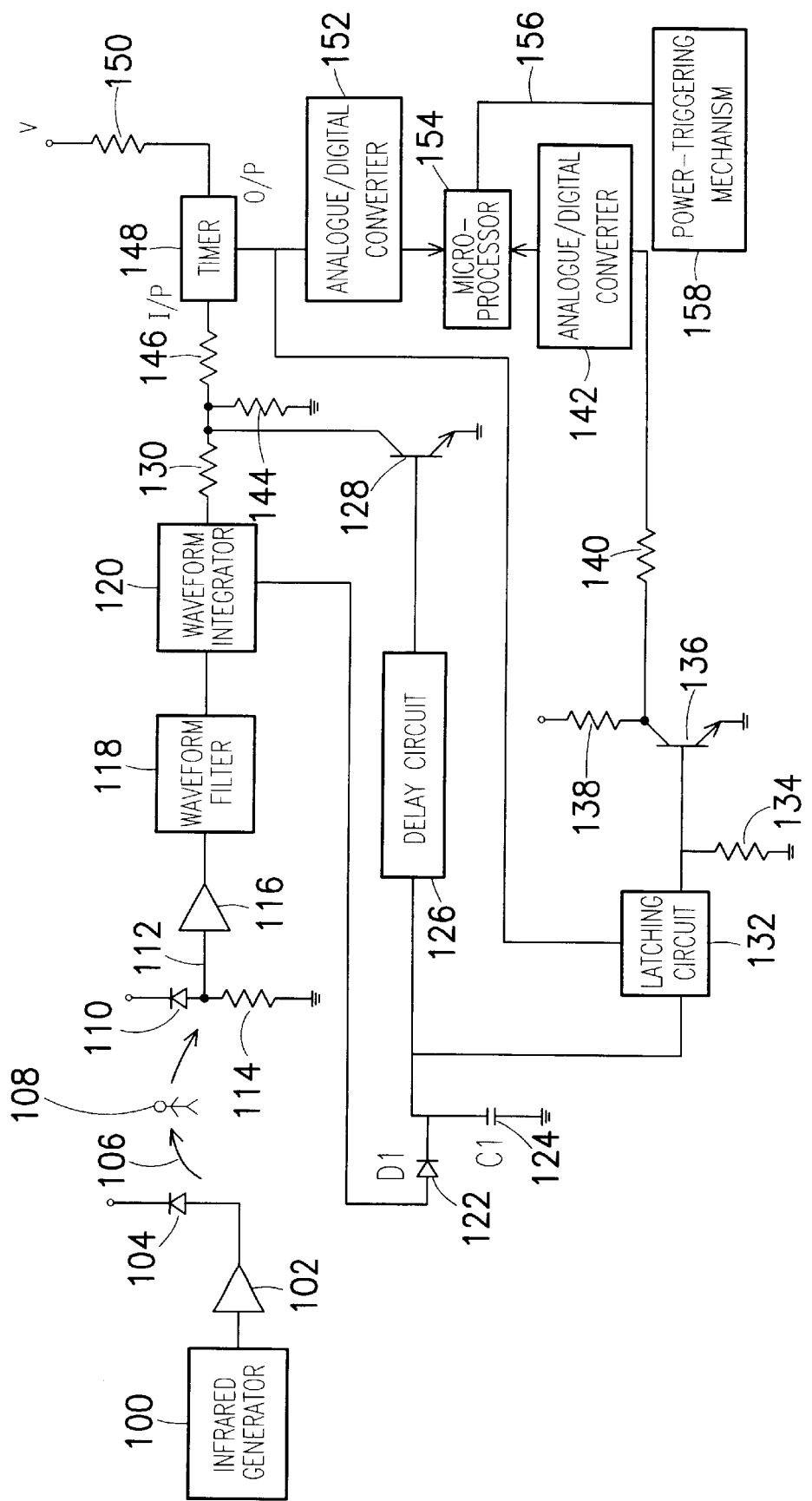
FIG. 3 is a block diagram showing a computer device capable of detecting user status according to a second embodiment of this invention.

FIG. 3 is a block diagram showing a second sensor apparatus capable of detecting user status according to a second embodiment of this invention. The second sensor apparatus includes an infrared generator 100, a first amplifier 102, a light-emitting diode 104, an infrared detector 110, a first resistor 114, a second amplifier 116, a waveform filter 118, a waveform integrator 120, a diode 122, a capacitor 124, a delay circuit 126, a first bipolar transistor 128, a second resistor 130, a latching circuit 132, a third resistor 134, a second bipolar transistor 136, a fourth resistor 138, a fifth resistor 140, a first analog/digital converter 142, a sixth resistor 144, a seventh resistor 146, a timer 148, an eighth resistor 150, a second analog/digital converter 152, a microprocessor 154 and a power-triggering mechanism 158.

The infrared generator 100, the first amplifier 102 and the light-emitting diode 104 together produce a transmission signal 106. The transmission signal 106 is used to determine if a user 108 is within a detecting region of the computer system. The infrared detector 110 receives the transmission signal 106 after reflected from the detecting region, thereby obtaining the correct user status. According to the user status, the infrared detector 110 sends a status signal 112 to the first resistor 114 and the second amplifier 116 respectively. Signal continues to pass from the second amplifier 116 to the waveform filter 118 and then to the waveform integrator 120. From the waveform integrator 120, signal passes to the diode 122, the capacitor 124, the delay circuit 126 and the first bipolar transistor 128. The base terminal of the first bipolar transistor 128 connects with the delay circuit 126, the collector terminal connects with a terminal of the second resistor 130 and the emitter terminal connects with an earth terminal. The latching circuit 132 connects with a terminal of the capacitor 124. The other terminal of the latching circuit 132 connects with the third resistor 134, the second bipolar transistor 136 (the base terminal connected to the latching circuit 132, the emitter terminal connected to an earth terminal), the fourth resistor 138 (one terminal connected with the collector terminal of the second bipolar transistor 136, the other terminal connected to a high voltage), the fifth resistor 140 and the first analog/digital converter 142. The other terminal of the second resistor 130 connects with the timer 148 (a first terminal connects with the other terminal of the seventh resistor 146, a second terminal connects with the latching circuit 132, a third terminal connects with one terminal of the eighth resistor 150 and the other terminal of the eighth resistor 150 connects to a high voltage) via the sixth resistor 144 and the seventh resistor 146. The timer 148 also connects with the second analog/digital converter 152. The microprocessor 154 connects with the first analog/digital converter 142 and the second analog/digital converter 152. The microprocessor 154 sends out a processing signal 156 to the power-triggering mechanism 158. The power-triggering mechanism 158 initiates the start-up program if the computer is off and the user status indicates the presence of user within the detectable range of the computer. Conversely, the power-triggering mechanism 158 initiates the shutdown routine if the computer is on and the user status indicates the absence of any user.

The second sensor apparatus starts to operate when a user 108 steps into the sensing region of the system. The computer device detects the presence of the user and then generates a status signal 112. Through the waveform filter 118 and the waveform integrator 120, the status signal 112 is further delayed, for example, by 7 seconds after passing the delay circuit 126. A low voltage is output to the first bipolar transistor 128 so that transistor 128 is cut off. Thereafter, the timer 148 starts to count, at the end of which a high voltage is output from the output terminal so that the latching circuit 132 is on. Therefore, the first analog/digital converter 142 receives a low voltage signal. Conversely, when the user 108 walks away from the system, a no voltage status signal is input to the system. Thus, although the output terminal of the counter 148 is still at a high voltage, no voltage is sent from the waveform filter 118 and the waveform integrator 120 to the diode 122, the capacitor 124. Hence, the latching circuit 132 is off and the second analog/digital converter 152 receives a high voltage signal.

Figure 4:
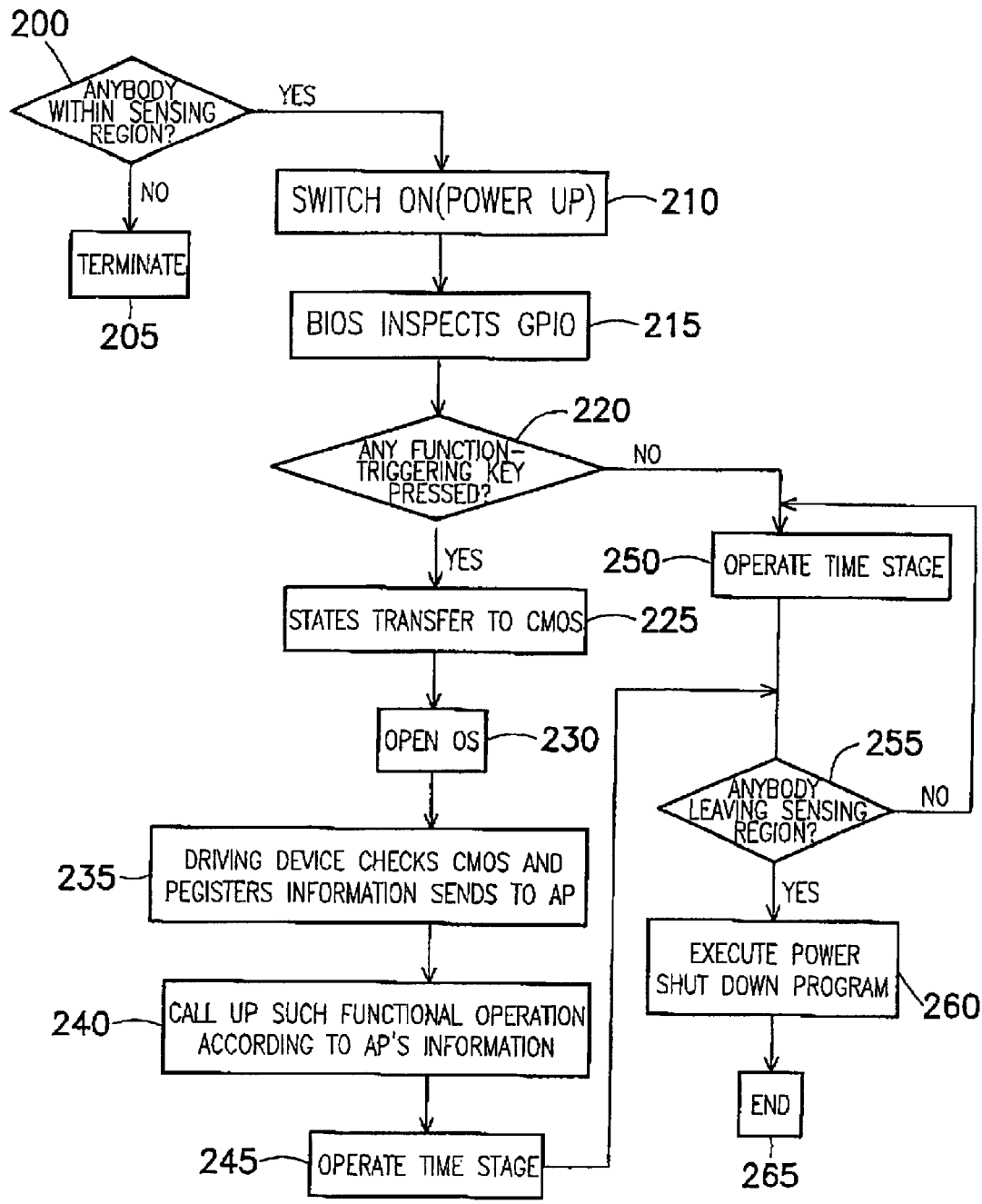
FIG. 4 is a flow chart showing the steps for operating the computer devices shown in FIGS. 1 and 3.

FIG. 4 is a flow chart showing the steps for operating the computer devices shown in FIGS. 1 and 3. First, assume that the computer device is off. In step 200, the system monitors if anybody walks into the sensing region of the computer device. If nobody is found, the monitoring ends in step 205. On the other hand, if someone is found within the sensing region longer than a preset period, the start-up program is initiated in step 210. In step 215, GPIO is inspected using BIOS. In step 220, the system is checked to see if any special function key is pressed. If one of the special function keys is pressed, the steps 225, 230, 235 and 240 are sequentially conducted. In step 225, current states are stored in the CMOS. In step 230, the OS is opened. In step 235, the driving unit inspects the CMOS and registers information in the application program (AP). According to the registered information, the AP initiates the specified function before returning to step 245. In step 245, control returns to the actual operating period. On the contrary, if no special function key is pressed in step 220, step 250 is directly executed and the actual operating period is initiated. Finally, in step 255, the user is under constant surveillance. If the user remains in the sensing region, control returns to step 250 and actual operation period continues. On the other hand, if the user leaves the sensing region longer than a preset period, step 260 is executed so that the computer system is prepared for shutdown. In step 265, all operations within the computer system are suspended and the power source is switched off. The system returns to the status monitoring in step 220.

Figure 5:
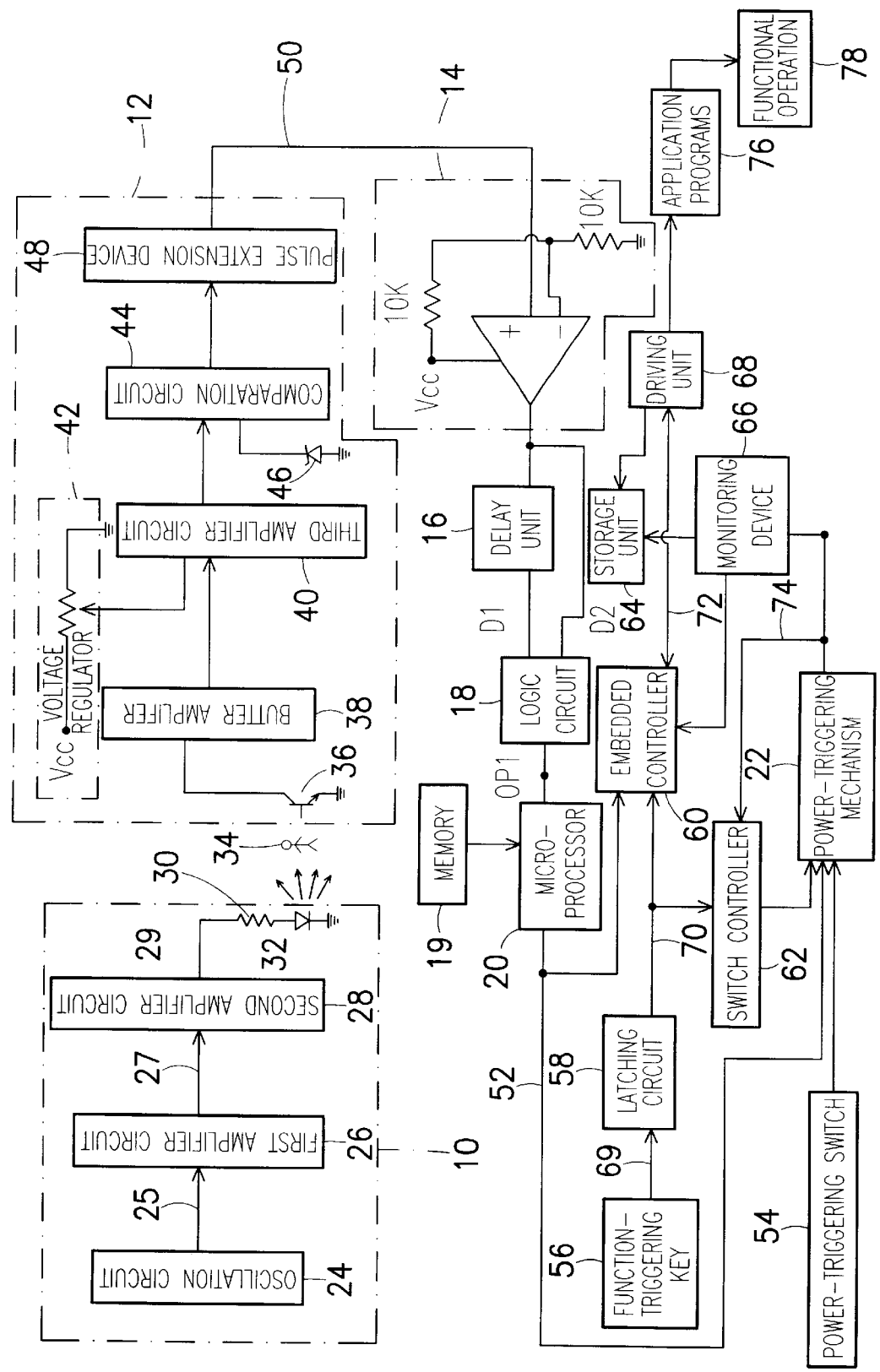
FIG. 5 is a block diagram showing a computer device capable of detecting user status as well as directly linking with a computer network according to this invention.

In addition to the conventional method of using a power-triggering switch to turn the power source on and the aforementioned power-triggering mechanism, a special function triggering mechanism can be introduced. The special function triggering mechanism may provide functions such as system start-up and networking capabilities. For example, a direct dial to a computer network or direct dial to e-mail server may be set. In fact, a special function triggering mechanism may be directly added to the computer device shown in FIG. 1. FIG. 5 is a block diagram showing a computer device capable of detecting user status as well as directly linking with a computer network according to this invention. Components that are identical to the ones in FIG. 1 are labeled identically in FIG. 5. Aside from a signal generator 10, a signal receiver 12, an analog/digital converter 14, a delay unit 16, a logic circuit 18, a microprocessor 20 and a power-triggering mechanism 22, the automatic network linking system further includes at least one function-triggering key 56, a latching circuit 58, a embedded controller 60, a switch controller 62, a storage device 64, a monitoring device 66 and a driving unit 68.

When one of the function-triggering keys on the computer device is pressed, a triggering signal 69 is produced and transmitted to the latching circuit 58. A latching signal 70 is generated by the latching circuit 58. The embedded controller 60, the latching circuit 58 and the microprocessor 20 are connected so that a scan signal 72 is produced after receiving the latching signal 70 and the processing signal 52. In the meantime, the switch controller 62, the latching circuit 58 and the power-triggering mechanism 22 are connected so that whether the latching signal 70 should be received and sent to the power-triggering mechanism 22 can be determined. The switch controller 62 is on if the power-triggering mechanism 22 has not initiated the start-up program. Once the start-up program is initiated, a cutoff signal 74 is sent to the switch controller 62 for preventing the re-initiation of the start-up program. The storage device 64 is used for data storage. The monitoring device 66 is responsible for writing the scan signal generated by the embedded controller 60 into the storage device 64. The driving unit 68 and the embedded controller 60 are connected so that the scan signal 72 can be used to drive one among a plurality of application programs 76 and then generate a corresponding functional performance 78. In one example of the present invention, the monitoring device is a BIOS (basic input/output system).

Figure 6:
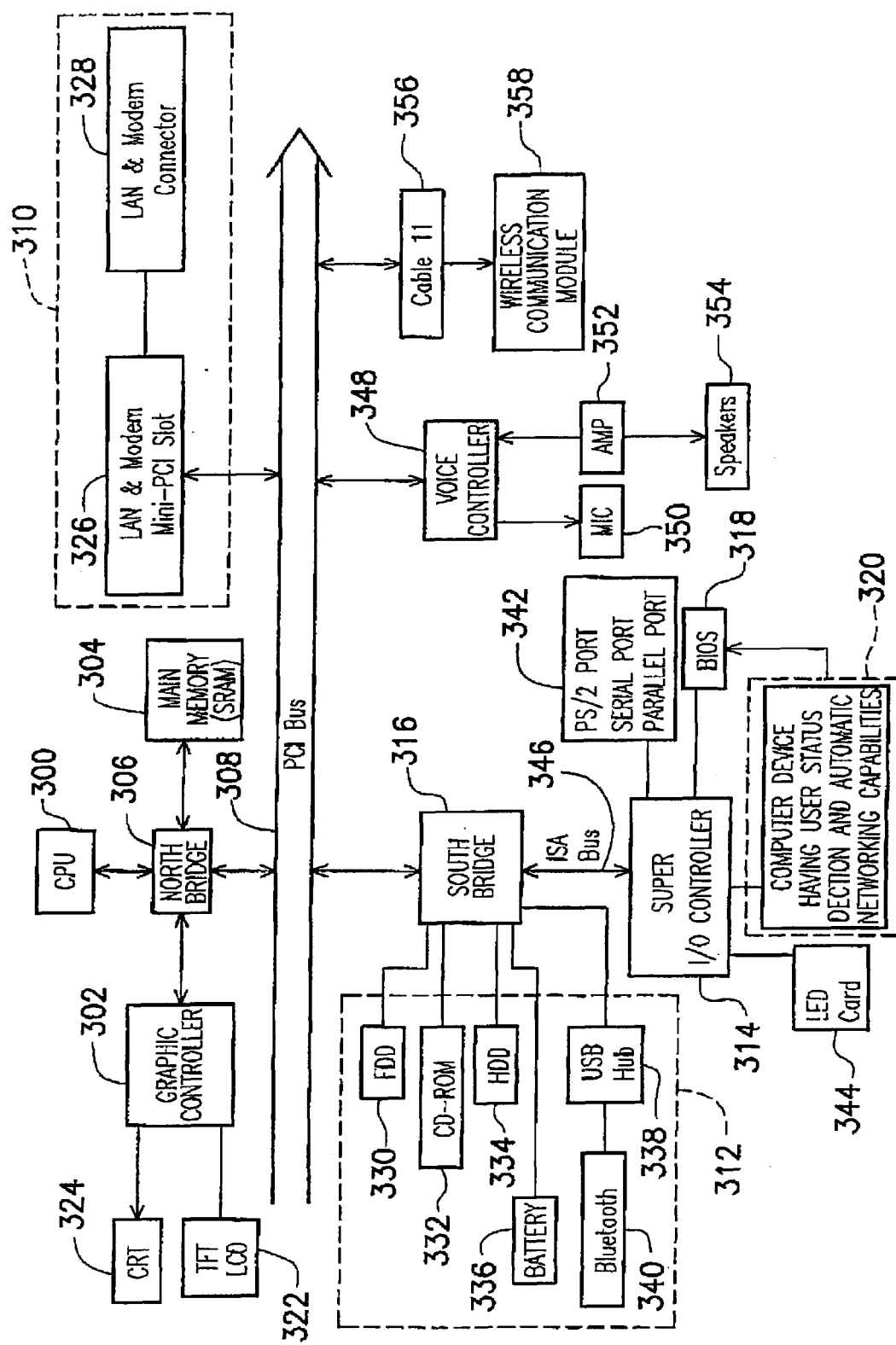
FIG. 6 is a block diagram showing a computer system having the capacity to detect user status as well as to link up with a computer network automatically according to this invention.

Similarly, the invention can integrate with a computer system to provide user status sensing, and automatic network linking function. FIG. 6 is a block diagram showing a computer system having the capacity to detect user status as well as to link directly with a computer network according to this invention. The user status and automatic network linking computer device as shown in FIG. 5 (labeled 320 in FIG. 6) is integrated within the complete computer system in FIG. 6.

As shown in FIG. 6, the computer system mainly includes a CPU 300, a graphic controller 302, a main memory unit 304, a North Bridge 306, a PCI (system) bus 308, a network-linking controller 310, a plurality of peripheral support devices 312, an input/output controller 314, a South Bridge 316, a basic input/output system 318 and a computer device 320 having the capacity to sense user status and link up with a computer network automatically.

The CPU 300 controls all data transactions. The graphic controller 302 processes image data and displays text data and image data on a liquid crystal display (LCD) 322 or a cathode ray tube (CRT) 324. The main memory unit 304 is a device for recording and holding data. The main memory unit 304 can be, for example, SDRAM or DRAM. The CPU 300, the graphic controller 302 and the main memory unit 304 are all connected to the North Bridge 306 for integrating the operation of those devices. The North Bridge 306 also connects with the PCI bus 308 for transmitting data to other devices. The network-linking controller 310 has a local area network (LAN) and modem mini-PCI slot that connects with the PCI bus 308. A LAN and modem connector 328 connects with the LAN and modem mini-PCI slot for providing a networking link.

The peripheral support devices are auxiliary items that enhance user performance. A computer system may include all or some of the peripheral support devices, including a floppy disk drive 330, a CD-ROM 332, a hard drive 334, a battery 336 and a USB hub 338. The USB hub 338 may further connect with a Blue tooth 340. The input/output controller 314 is a device for receiving or transmitting user data. The South Bridge 316 is connected to the PCI bus 308, the peripheral support devices 312 and the input/output controller 314. The South Bridge 316 is responsible for integrating the operations between the peripheral support devices 312 and the input/output controller 314. The input/output controller 314 may connect with an external input device (not shown) via a PS/2 port, a serial port or a parallel port 342. The input/output controller 314 may also connect with a LED card 344 for displaying output data.

The basic input/output system (BIOS) 318 and the input/output controller 314 are connected. Furthermore, the direct networking driver (device) and the BIOS 318 are also connected so that a driving program can be sent to the BIOS 318 for direct linking with a computer network. This invention may also include a voice controller 348 connected to the PCI bus 308. The voice controller 348 connects with a receiver 350 and an emitter 354. The receiver 350 can be a microphone (MIC) for receiving a voice signal. The emitter 354 may include a loudspeaker and an amplifier 352 for producing sound. In addition, the computer system may include a piece of cable 11 (356) that links the PCI bus 308 with a wireless communication module 358.

In conclusion, one major aspect of this invention is the automatic start-up and shutdown of a computer system according to whether a user is close by or far away. Hence, less time is wasted in the process of starting up or shutting down the computer system and less energy is wasted when the user leaves the computer system without turning the system off. Moreover, the invention permits the incorporation of special function keys so that any one of the special functions may be called up along with system start-up. Furthermore, the computer system can be used for linking up with a computer network automatically.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer device having a sensing circuit for determining a user status and switching a computer accordingly, comprising:

a signal generator that sends out a transmission signal to a detection region close to the computer for determining whether a user is inside or outside the detection region;

a signal receiver for receiving the transmission signal from the detection region and sending out a user status signal according to the present or absence of the user;

an analog/digital converter for converting the status signal into a digital signal;

a delay unit connected to the analog/digital signal for receiving the digital signal and sending out a delay signal after a delay period;

a logic circuit connected to the delay unit and the analog/digital converter for receiving the digital signal and the delay signal and producing a logical signal after a logical computation;

a microprocessor connected to the logic circuit for receiving the logic signal and outputting a processing signal; and a power-triggering mechanism connected to the microprocessor for starting the computer if the processing signal indicates the users is inside the detecting region and the computer is off, and for shutting down the computer if the processing signal indicates the user is outside the detecting region and the computer is still on.

2. The computer device of claim 1, wherein the transmission signal comprises an infrared signal.

3. The computer device of claim 1, wherein the transmission signal comprises an ultrasonic signal.

4. The computer device of claim 1, wherein the signal generator further comprises an oscillator circuit for generating an oscillatory signal, a first amplifier for receiving the oscillatory signal and generating a first amplified signal, a second amplifier circuit for receiving the first amplified signal and generating a second amplified signal, a resistor with one terminal connected to the second amplifier circuit and a light-emitting diode connected to the other terminal of the resistor for generating the transmission signal.

5. The computer device of claim 1, wherein the signal receiver further comprises:

a transistor sensor;

a buffer amplifier connected to the transistor sensor;

a third amplifier connected to the buffer amplifier;

a voltage regulator connected to the third amplifier;

a comparator connected to the third amplifier;

a Zener diode connected to the comparator; and a pulse delay device connected to the comparator circuit.

6. A computer device having a sensing circuit for finding a user status and switching a computer accordingly, comprising:

an infrared generator;

a first amplifier connected to the infrared generator;

a light-emitting diode connected to the first amplifier, wherein the light-emitting diode sends out a transmission signal to a detection region close to the computer so that whether a user is inside or outside the detection region can be determined;

an infrared detector for receiving the transmission signal from the detection region and sending out a status signal according to the presence or the absence of the user;

a first resistor having one terminal connected to the infrared detector and the other terminal connected to an earth terminal;

a second amplifier connected to one terminal of the first resistor for receiving the status signal;

a waveform filter connected to the second amplifier;

a waveform integrator connected to the waveform filter;

a second resistor having one terminal connected to the waveform integrator;

a diode connected to the waveform integrator;

a capacitor having one terminal connected to the diode and the other terminal connected to an earth terminal;

a delay circuit connected to the diode;

a first bipolar transistor having a base terminal connected to the delay circuit, a collector terminal connected to the other terminal of the second resistor and an emitter terminal connected to an earth terminal;

a latching circuit connected to one terminal of the capacitor;

a third resistor having one terminal connected to the latching circuit and the other terminal connected to an earth terminal;

a second bipolar transistor having a base terminal connected to the latching circuit and an emitter terminal connected to an earth terminal;

a fourth resistor having one terminal connected to a collector terminal of the second bipolar transistor and the other terminal connected to a high voltage;

a fifth resistor having one terminal connected to one terminal of the fourth resistor;

a first analog/digital converter connected to the other terminal of the fifth resistor;

a sixth resistor having one terminal connected to the other terminal of the second resistor and the other terminal connected to an earth terminal;

a seventh resistor having one terminal connected to the other terminal of the second resistor;

a timer having a first terminal connected to the other terminal of the seventh resistor and a second terminal connected to the latching circuit;

an eighth resistor having one terminal connected to a third terminal of the timer and the other terminal connected to a high voltage;

a second analog/digital converter connected to the timer;

a microprocessor connected to the first analog/digital converter and the second analog/digital converter for sending out a processing signal; and a power-triggering mechanism connected to the microprocessor for starting the computer if the processing signal indicates the users is inside the detecting region and the computer is off, and for shutting the computer if the processing signal indicates the user is outside the detecting region and the computer is still on.

7. The computer device of claim 6, wherein the device further comprises:

at least one function-triggering key on the computer device for generating a triggering signal;

a latching circuit connected to the function-triggering key for receiving the triggering signal and generating a latching signal;

a embedded controller connected to the latching circuit and the microprocessor for receiving the latching signal and the processing signal and generating a scan signal;

a switching controller connected to the latching circuit and the power-triggering mechanism for deciding whether to receive the latching signal and transmit the latching signal to the power-triggering mechanism;

a storage device for holding data;

a monitoring device for writing data into the storage device when the embedded controller generates a scan signal; and a driving unit connected to the embedded controller for receiving the scan signal and driving one among a plurality of application programs;

wherein the specified function corresponding to a particular functional key is provided when the functional key is pressed.

8. The computer device of claim 7, wherein the function-triggering key comprises a direct dial immediate networking function and a direct dial immediate e-mail retrieving function.

9. A computer device having a sensing circuit for finding a user status and switching a computer accordingly, an automatic networking capability and a capacity for selecting the type of functional operation immediately after system start-up, comprising:

a signal generator that sends out a transmission signal to a detection region close to the computer for determining whether a user is inside or outside the detection region;

a signal receiver for receiving the transmission signal from the detection region and sending out a user status signal according to the present or absence of the user;

an analog/digital converter for receiving the status signal and converting the status signal into a digital signal;

a delay unit connected to the analog/digital signal for receiving the digital signal and sending out a delay signal after a delay period;

a logic circuit connected to the delay unit and the analog/digital converter for receiving the digital signal and the delay signal and producing a logical signal after a logical computation;

a microprocessor connected to the logic circuit for receiving the logic signal and outputting a processing signal;

a power-triggering mechanism connected to the microprocessor for starting the computer if the processing signal indicates the users is inside the detecting region and the computer is off, and for shutting down the computer if the processing signal indicates the user is outside the detecting region and the computer is still on;

at least one function-triggering key on the computer device for generating a triggering signal;

a latching circuit connected to the function-triggering key for receiving the triggering signal and generating a latching signal;

a embedded controller connected to the latching circuit and the microprocessor for receiving the latching signal and the processing signal and generating a scan signal;

a switching controller connected to the latching circuit and the power-triggering mechanism for deciding whether to receive the latching signal and transmitting the latching signal to the power-triggering mechanism;

a storage device for holding data;

a monitoring device for writing data into the storage device when the embedded controller generates a scan signal; and a driving unit connected to the embedded controller for receiving the scan signal and driving one among a plurality of application programs;

wherein the specified function corresponding to a particular functional key is provided when the functional key is pressed.

10. The computer device of claim 9, wherein the transmission signal comprises an infrared signal.

11. The computer device of claim 9, wherein the transmission signal comprises an ultrasonic signal.

12. The computer device of claim 9, wherein the signal generator further comprises an oscillator circuit for generating an oscillatory signal, a first amplifier for receiving the oscillatory signal and generating a first amplified signal, a second amplifier circuit for receiving the first amplified signal and generating a second amplified signal, a resistor with one terminal connected to the second amplifier circuit and a light-emitting diode connected to the other terminal of the resistor for generating the transmission signal.

13. The computer device of claim 9, wherein the signal receiver further comprises:

a transistor sensor;

a buffer amplifier connected to the bipolar transistor;

a third amplifier connected to the buffer amplifier;

a voltage regulator connected to the third amplifier;

a comparator connected to the third amplifier;

a Zener diode connected to the comparator; and a pulse delay device connected to the comparator circuit.

14. The computer device of claim 9, wherein the function-triggering key comprises a direct dial immediate networking function and a direct dial immediate e-mail retrieving function.

15. A computer system having a sensing circuit for finding a user status and switching a computer accordingly, an automatic networking capability and a capacity for selecting the type of functional operation immediately after system start-up, comprising:

a central processing unit for controlling all data transactions;

a graphic controller for processing image and displaying text and image data;

a main memory unit for recording and holding data;

a North Bridge connected to the central processing unit, the graphic controller and the main memory unit for integrating their functions;

a system bus connected to the North Bridge for transmitting data to or from other devices;

a plurality of peripheral support devices for performing auxiliary user functions;

an input/output controller for receiving user input/output data;

a South Bridge connected to the system bus, the peripheral support devices and the input/output controller for integrating the functions of the peripheral support devices and the input/output controller;

a basic input/output system connected to the input/output controller; and a computer device having a sense circuit for finding user status and automatic networking capability connected to the input/output controller for sending out a triggering program, wherein the computer device further comprises:
- a signal generator that sends out a transmission signal to a detection region close to the computer for determining whether a user is inside or outside the detection region; and
- a signal receiver for receiving the transmission signal from the detection region and sending out a user status signal according to the present or absence of the user;
- an analog/digital converter for converting the status signal into a digital signal;
- a delay unit connected to the analog/digital signal for receiving the digital signal and sending out a delay signal after a delay period;
- a logic circuit connected to the delay unit and the analog/digital converter for receiving the digital signal and the delay signal and producing a logical signal after a logical computation;
- a microprocessor connected to the logic circuit for receiving the logic signal and outputting a processing signal;
- a power-triggering mechanism connected to the microprocessor for starting the computer if the processing signal indicates the user is inside the detecting region and the computer is off, and for shutting down the computer if the processing signal indicates the user is outside the detecting region and the computer is still on;
- at least one function-triggering key on the computer device for generating a triggering signal;
- a latching circuit connected to the function-triggering key for receiving the triggering signal and generating a latching signal;
- a embedded controller connected to the latching circuit and the microprocessor for receiving the latching signal and the processing signal and generating a scan signal;
- a switching controller connected to the latching circuit and the power-triggering mechanism for deciding whether to receive the latching signal and transmitting the latching signal to the power-triggering mechanism;
- a storage device for holding data;
- a monitoring device for writing data into the storage device when the embedded controller generates a scan signal; and
- a driving unit connected to the embedded controller for receiving the scan signal and driving one among a plurality of application programs, wherein the specified function corresponding to a particular functional key is provided when the functional key is pressed.

16. The computer system of claim 15, wherein the system further comprises a display device connected to the graphic controller.

17. The computer system of claim 16, wherein the display device comprises a liquid crystal display.

18. The computer system of claim 16, wherein the peripheral support devices comprise a floppy disk drive, a CD-ROM, a hard drive, a battery and a USB hub.

19. The computer system of claim 15, wherein the system further comprises a Bluetooth connected to a USB hub.

20. The computer system of claim 15, wherein the system further comprises a PS/2 port connected to the input/output controller.

21. The computer system of claim 15, wherein the system further comprises a serial port connected to the input/output controller.

22. The computer system of claim 15, wherein the system further comprises a parallel port connected to the input/output controller.

23. The computer system of claim 15, wherein the system further comprises an LED card connected to the input/output controller.

24. The computer system of claim 15, wherein the system further comprises a voice controller connected to a PCI bus.

25. The computer system of claim 15, wherein the system further comprises a voice receiver connected to a voice controller for receiving a voice signal and a sound producer connected to the voice controller for outputting voice signal.

26. The computer system of claim 15, wherein the system further comprises a cable connected to a PCI bus.

27. The computer system of claim 26, wherein the system further comprises a wireless communication module connected to the cable.

28. The computer system of claim 15, wherein the system further comprises a network controller having a local area network and modem connector connected to a local area network and modem mini-PCI slot.

29. The computer system of claim 15, wherein the main memory comprises SDRAM.

* * * * *